US005833063A

United States Patent [19]

Ho

[11] Patent Number: 5,833,063

[45] Date of Patent: Nov. 10, 1998

[54] PLASTIC LOOSE-LEAF BAG CAPABLE OF STORING A COMPACT DISK THEREIN

[76] Inventor: Chin-Lien Ho, No. 36, Lo-Yang Rd., Hsi-Tun Dist., Taichung City, Taiwan

[21] Appl. No.: 961,090

[22] Filed: Oct. 30, 1997

[51] Int. Cl.[6] .................... B65D 85/57

[52] U.S. Cl. .................... 206/308.1; 206/311; 206/313

[58] Field of Search .................... 206/308.1, 380.3, 206/311–313; 229/68.1, 70, 76

[56] References Cited

U.S. PATENT DOCUMENTS

| | | | |
|---|---|---|---|
| 4,850,731 | 7/1989 | Youngs | 206/308.1 |
| 4,863,032 | 9/1989 | Bothe et al. | 206/312 |
| 4,971,195 | 11/1990 | Mitsuyama | 206/206 |
| 5,462,160 | 10/1995 | Youngs | 206/312 |
| 5,556,683 | 9/1996 | Ranalli | 206/311 |

*Primary Examiner*—Jim Foster
*Attorney, Agent, or Firm*—Baker & Botts, L.L.P.

[57] ABSTRACT

A plastic loose-leaf bag is capable of storing a compact disk therein. The bag includes a backing sheet portion with a disk protecting cloth for preventing the backing sheet portion from scratching the compact disk. A front sheet portion extends from the lower edge of the backing sheet portion and is folded toward the backing sheet portion. The opposite lateral side sections of the front sheet portion are connected to the backing sheet portion to confine a pouch for receiving a section of the compact disk. A cover sheet portion extends from the upper edge of the backing sheet portion and is foldable toward the front sheet portion to prevent the compact disk from being released from the pouch. As such, a plurality of the bags can be bound in a binder unit to facilitate carrying of a number of the compact disks.

12 Claims, 5 Drawing Sheets

PLASTIC LOOSE-LEAF BAG CAPABLE OF STORING A COMPACT DISK THEREIN

BACKGROUND OF THE INVENTION

1. Field of the Invention

This invention relates to a storage device for compact disks, more particularly to a plastic loose-leaf bag for storing a compact disk therein.

2. Description of the Related Art

Referring to FIG. 1, a conventional storage box 10 for a compact disk is shown to include a base 11 and a cover 12, and is generally made of rigid plastic. The base 11 has a circular concavity 111 for receiving a compact disk (not shown) therein, and a resilient clamp member 112 provided in the concavity 111 for securing the compact disk on the base 11. The cover 12 has two pivot pins 121, 122 for engaging pivotally the base 11 so as to cover and uncover the base 11. Two projecting edges 123, 124 of the cover 12 are formed with two protrusions 125, 126 which engage removably two grooves 113, 114 in the base 11 so as to lock releasably the cover 12 on the base 11. However, because only one disk can be stored in each storage box 10, a plurality of the storage boxes 10 are needed when storing a plurality of compact disks. The storage boxes 10 occupy a large amount of space when stacked and are inconvenient to carry. In addition, it is inconvenient to search and remove a desired compact disk from a stack of the storage boxes 10, especially if the latter are not provided with labels.

The main object of the present invention is to provide a loose-leaf bag which is capable of storing and protecting a compact disk and which can be mounted in a binder unit to facilitate carrying of a number of the compact disks.

According to this invention, a plastic loose-leaf bag is capable of storing a compact disk therein. The bag includes a backing sheet portion with a disk protecting cloth for preventing the backing sheet portion from scratching the compact disk. A front sheet portion extends from the lower edge of the backing sheet portion and is folded toward the backing sheet portion. The opposite lateral side sections of the front sheet portion are connected to the backing sheet portion to confine a pouch for receiving a section of the compact disk. A cover sheet portion extends from the upper edge of the backing sheet portion and is foldable toward the front sheet portion to prevent the compact disk from being released from the pouch. In addition, the upper edge of the backing sheet portion has a label piece which is cut-out from the cover sheet portion for identification of the disk. Furthermore, a plurality of the bags can be bound in a binder unit to facilitate carrying of a number of the compact disks.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
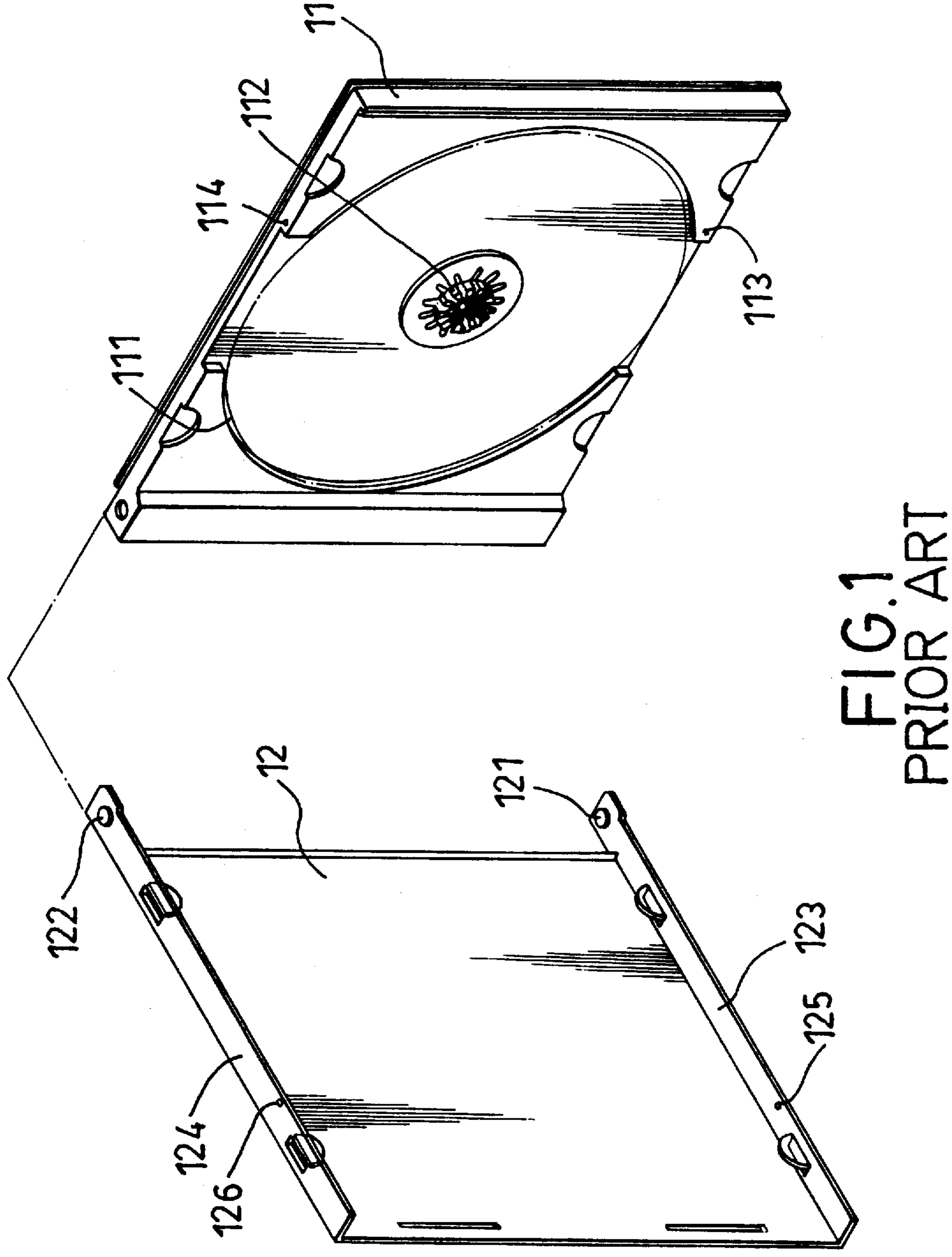
FIG. 1 is an exploded view of a conventional storage device for a compact disk.
Figure 2:
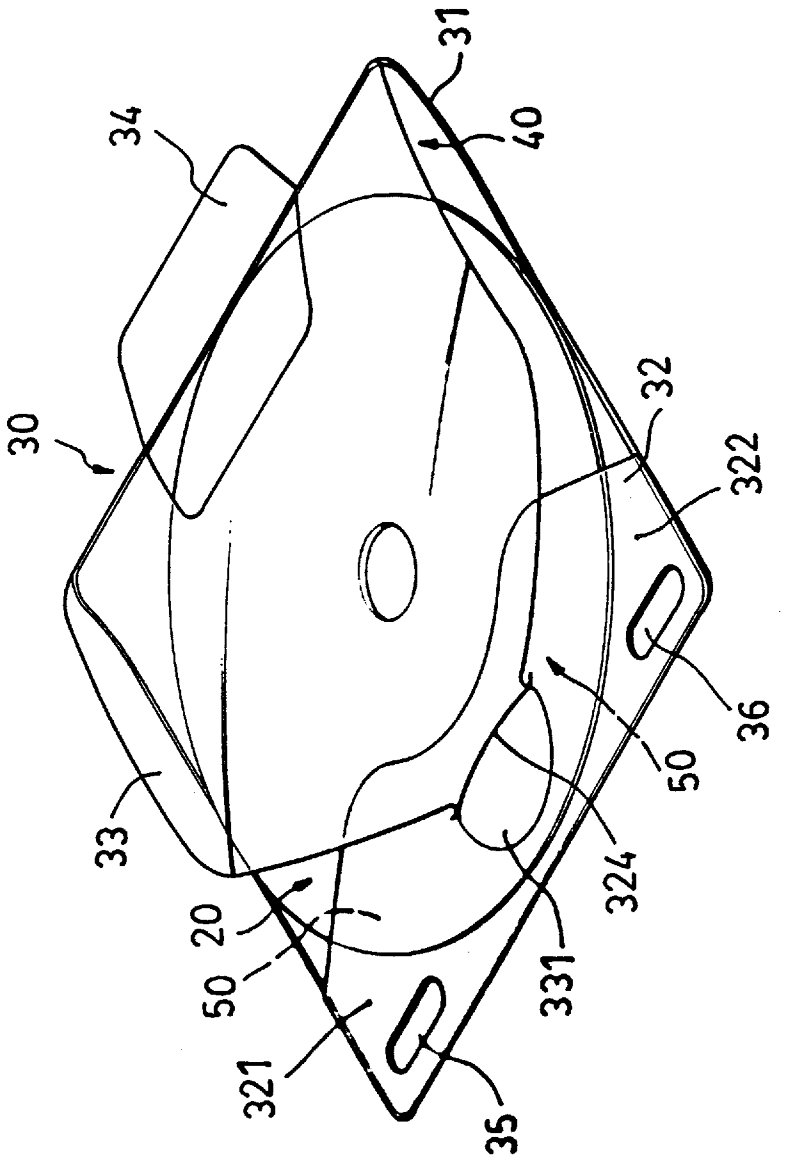
FIG. 2 is a perspective view of a preferred embodiment of a loose-leaf bag according to this invention.
Figure 3:
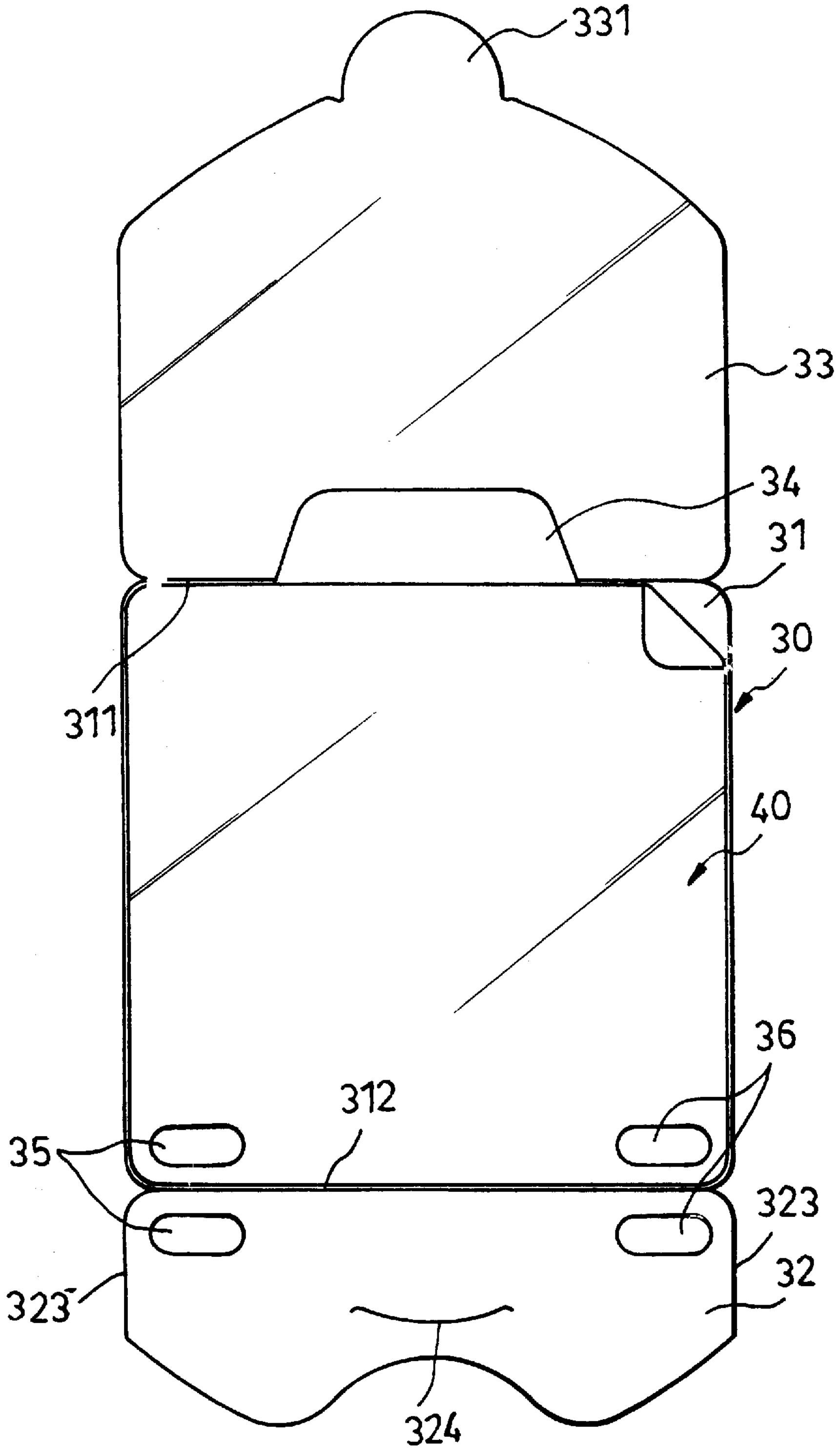
FIG. 3 is a schematic view showing the different portions of the loose-leaf bag before the latter are folded.

Referring to FIGS. 2 and 3, the preferred embodiment of a loose-leaf bag 30 according to the present invention is shown to comprise a plastic base sheet which is formed with a backing sheet portion 31, a front sheet portion 32 and a cover sheet portion 33.

The backing sheet portion 31 has a size corresponding to that of a compact disk (not shown), and an inner side with a disk protecting cloth 40 mounted thereon. The backing sheet portion 31 has opposed upper and lower edges 311, 312.

The front sheet portion 32 extends from the lower edge 312 of the backing sheet portion 31 and is folded toward the backing sheet portion 31. The front sheet portion 32 has opposite lateral side sections 323 which are connected to the backing sheet portion 31 so as confine a pouch 50 therewith. Preferably, the lateral side sections 323 have two points 321, 322 which are connected to the back sheet portion 31 by a known high frequency heat-sealing process. The backing and front sheet portions 31, 32 and the disk protecting cloth 40 are provided with a plurality of aligned mounting holes 35, 36 adjacent to the lower edge 312 of the backing sheet portion 31. The front sheet portion 32 is formed with a slit 324.

The cover sheet portion 33 extends from the upper edge 311 of the backing sheet portion 31 and is foldable toward the front sheet portion 32. A label piece 34 extends from the upper edge 311 of the backing sheet portion 33 and is formed by cutting at the cover sheet portion 33. In this embodiment, one end of the cover sheet portion 33 is formed with an insert piece 331 which is extendible through the slit 324 between the backing and front sheet portions 31, 32.

Figure 4:
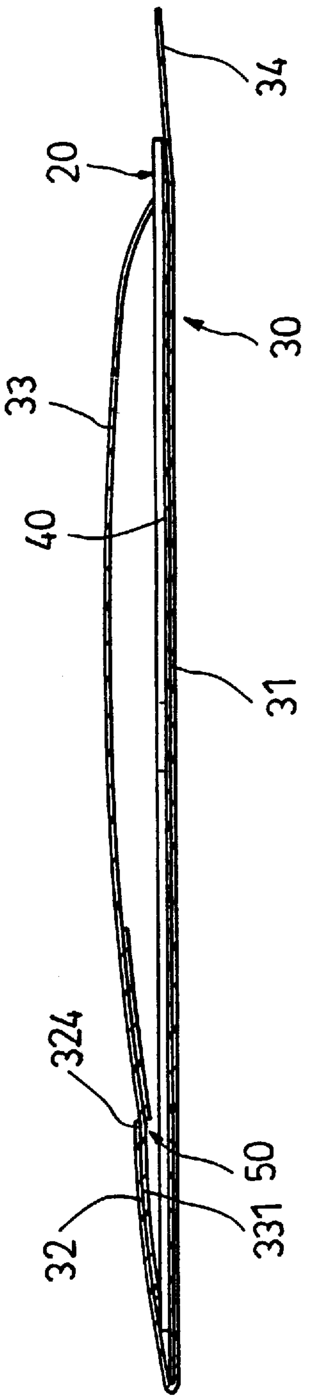
FIG. 4 is a sectional view of the preferred embodiment to show how a compact disk is stored therein.
Figure 5:
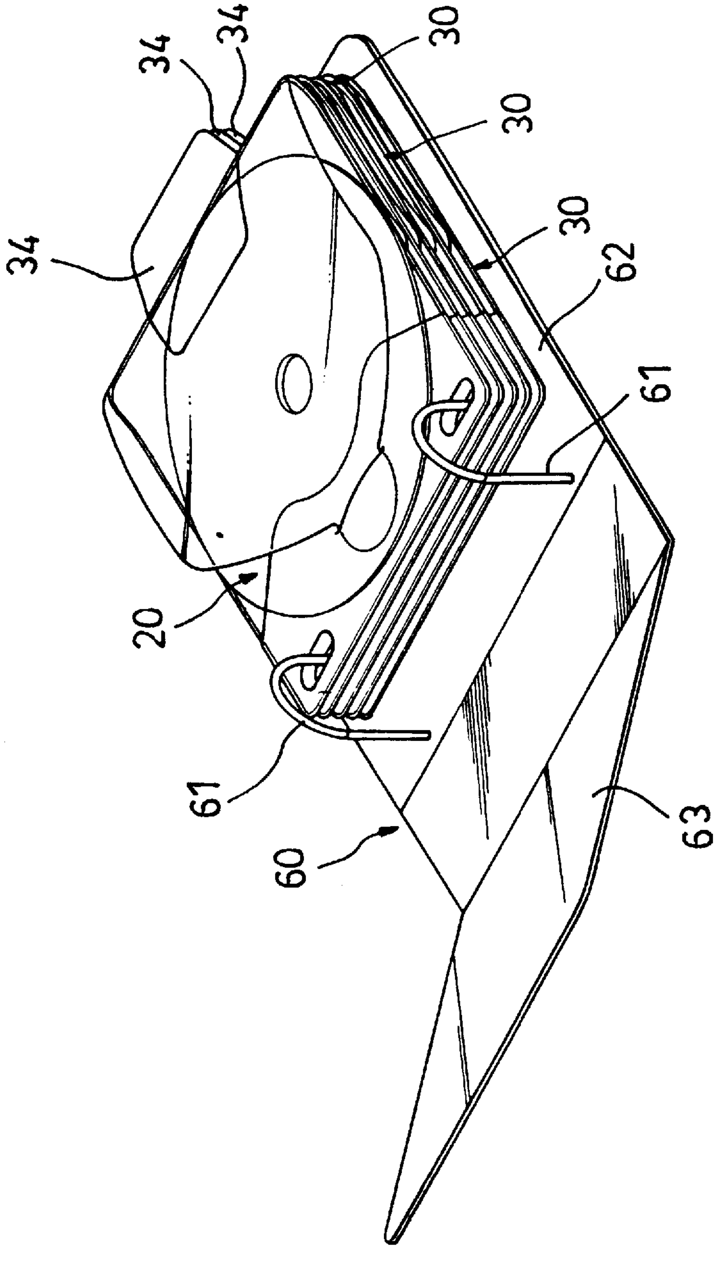
FIG. 5 is a perspective view showing how a plurality of the loose-leaf bags of FIG. 2 are bound by a binder unit to form a loose-leaf book in accordance with this invention.

Referring to FIGS. 2 and 4, a section of a compact disk 20 is inserted into the pouch 50 so as to lie against the disk protecting cloth 40 between the backing and front sheet portions 31, 32. The cover sheet portion 33 can be folded toward the front sheet portion 32 such that the insert piece 331 extends through the slit 324 in the front sheet portion 32. Therefore, the disk 20 can be prevented from being scratched by the disk protecting cloth 40 and from being released from the pouch 50. Referring to FIG. 5, when storing a plurality of compact disks, a binder unit 60 can be used. The binder unit 60 includes a base 62, a cover 63 which is connected to the base 62, and a loose-leaf binding set including two binding rings 61 which are mounted spacedly on the base 62. The binding rings 61 can pass through the mounting holes 35, 36 in a plurality of the loose-leaf bags 30 to bind the bags 30 between the base 62 and the cover 63. As such, with the use of the binder unit 60, carrying of a large number of compact disks 20 is facilitated. Moreover, a tag (not shown) can be written or attached onto the label piece 34 for identification of the disk 20 to facilitate searching of the desired compact disk 20 from the loose-leaf book that is constituted by the binder unit 60 and the loose-leaf bags 30.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A loose-leaf bag made of plastic and capable of storing a compact disk therein, comprising:

a backing sheet portion having a size corresponding to that of the compact disk and an inner side with a disk protecting cloth mounted thereon, said backing sheet portion having opposed upper and lower edges, said disk protecting cloth being capable of preventing said backing sheet portion from scratching the compact disk;

a front sheet portion extending from said lower edge of said backing sheet portion and being folded toward said backing sheet portion, said front sheet portion having opposite lateral side sections connected to said backing sheet portion so as to confine a pouch therewith, said pouch being adapted to receive at least a section of the compact disk; and a cover sheet portion extending from said upper edge of said backing sheet portion and being foldable toward said front sheet portion so as to be extendible between said backing and front sheet portions in order to prevent the compact disk from being released from said pouch.

2. A loose-leaf bag as defined in claim 1, wherein said backing and front sheet portions are provided with a plurality of aligned mounting holes adjacent to said lower edge of said backing sheet portion.

3. A loose-leaf bag as defined in claim 1, wherein said front sheet portion is formed with a slit, said cover sheet portion being formed with an insert piece that extends through said slit.

4. A loose-leaf bag as defined in claim 1, further comprising a label piece extending from said upper edge of said backing sheet portion.

5. A loose-leaf bag as defined in claim 4, wherein said label piece is cut-out from said cover sheet portion.

6. A loose-leaf bag as claim 1, wherein said opposite lateral side sections of said front sheet portion are connected to said backing sheet portion by a high frequency heat-sealing process.

7. A loose-leaf book capable of storing a plurality of compact disks therein, comprising:

a binder unit including a base, a cover connected to said base, and a loose-leaf binding set mounted to said base; and a plurality of loose-leaf bags bound by said loose-leaf binding set between said base and said cover of said binding unit, each of said loose-leaf bags being made of plastic and being capable of storing one of the compact disks therein, each of said loose-leaf bags including:

a backing sheet portion having a size corresponding to that of said one of the compact disks and an inner side with a disk protecting cloth mounted thereon, said backing sheet portion having opposed upper and lower edges, said disk protecting cloth being capable of preventing said backing sheet portion from scratching said one of the compact disks;

a front sheet portion extending from said lower edge of said backing sheet portion and being folded toward said backing sheet portion, said front sheet portion having opposite lateral side sections connected to said backing sheet portion so as to confine a pouch therewith, said pouch being adapted to receive at least a section of said one of the compact disks; and a cover sheet portion extending from said upper edge of said backing sheet portion and being foldable toward said front sheet portion so as to be extendible between said backing and front sheet portions in order to prevent said one of the compact disks from being released from said pouch.

8. A loose-leaf book as defined in claim 7, wherein said backing and front sheet portions are provided with a plurality of aligned mounting holes adjacent to said lower edge of said backing sheet portion.

9. A loose-leaf book as defined in claim 7, wherein said front sheet portion is formed with a slit, said cover sheet portion being formed with an insert piece that extends through said slit.

10. A loose-leaf book as defined in claim 7, wherein each of said loose-leaf bags further includes a label piece extending from said upper edge of said backing sheet portion.

11. A loose-leaf book as defined in claim 10, wherein said label piece is cut-out from said cover sheet portion.

12. A loose-leaf book as claim 7, wherein said opposite lateral side sections of said front sheet portion are connected to said backing sheet portion by a high frequency heat-sealing process.

* * * * *